United States Patent Office 2,831,001
Patented Apr. 15, 1958

2,831,001

STEROID COMPOUNDS

Eugene J. Agnello, Barry M. Bloom, and Gerald D. Laubach, Jackson Heights, N. Y., assignors to Chas. Pfizer & Co., Inc., New York, N. Y., a corporation of Delaware No Drawing. Application January 29, 1957
Serial No. 636,875

4 Claims. (Cl. 260—397.45)

This invention is concerned with certain D-ring substituted steroid compounds and with methods for their preparation. The novel compounds of this invention are valuable either because they possess adrenocortical activity or because they are intermediates for the preparation of compounds possessing this activity.

Suitable starting materials for the synthesis of the compounds of this invention include $\Delta^{4,6}$-pregnadiene-14α,15α - epoxido - 11β,17α,21 - triol - 3,20 - dione, $\Delta^{4,6}$-pregnadiene - 14α,15α - epoxido - 17α,21 - diol - 3,11,20-trione and their twenty-one esters. These compounds can be prepared by the action of chloranil on the analogous 14α,15α-epoxido compounds as described in copending application, Serial No. 526,554, filed August 4, 1955. The 14,15-epoxides are prepared by the action of an oxidizing agent such as perbenzoic acid on $\Delta^{14,15}$-compounds as described in copending application, Serial No. 432,621, now abandoned, filed May 26, 1954. This latter application also describes the preparation of the $\Delta^{14,15}$-compounds.

The following formula is indicative of the compounds of this invention.

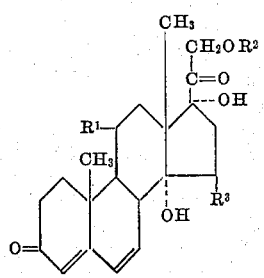

wherein $R^1$ is selected from the group consisting of β-hydroxyl and keto, $R^2$ is hydrogen or acyl hydrocarbon and $R^3$ is fluorine, chlorine, bromine, iodine or β-hydroxyl.

A 14α-hydroxy-15β-halo compound of this invention is prepared by opening the epoxide ring of a corresponding 14α,15α-epoxido compound with a halogen acid. A 14α,15β-diol of this invention is prepared by opening the epoxide ring with a non-nucleophilic acid. The term, "non-nucleophilic acid" is used herein in the customary sense, that is, to describe an acid, the anion of which does not attack centers possessing positive charges. Cf. Ingold, Chem. Rev. 15, 266 (1934).

In carrying out either of these reactions the 21-position carbon atom may carry an hydroxyl or an acylated hydroxyl group. The acylated hydroxyl group is readily prepared by standard methods from acyl hydrocarbon acylating agents. Conversion between hydroxyl and acylated hydroxyl is also readily accomplished by standard methods.

In general, opening of the epoxide ring with a hydrogen halide, that is, with hydrogen fluoride, hydrogen chloride, hydrogen bromide or hydrogen iodide is best conducted using at least a 25 molar excess, preferably a 50 to 100 molar excess of the chosen hydrogen halide in an inert organic solvent. Tetrahydrofuran, alcohol-free chloroform or acetic acid are preferred solvents although other lower aliphatic carboxylic acids containing up to five carbon atoms, for example, propionic; as well as hydrocarbon or halogenated hydrocarbon solvents, either aliphatic or aromatic containing up to seven carbon atoms may be used. These solvents include, for example, methylene chloride, ethylene chloride, chlorobenzene, carbon tetrachloride, hexane, toluene, benzene, etc. It is best to carry out the reaction at a temperature of from —60° to 30° C. The preferred temperature range is from —30° to 0° C. The reaction period may vary from one-half to four hours. Suitable yields are generally obtained, however, after about two hours. In a preferred application of the reaction an inert atmosphere, for example, nitrogen is used to decrease the possibility of side reactions.

A 14α,15β-diol of this invention is prepared by opening the 14α,15α epoxide ring of the chosen starting material with a non-nucleophilic acid as mentioned above. This reaction is best carried out in water-miscible, ether type, organic solvents such as dioxane or tetrahydrofuran, although water-miscible lower aliphatic ketones such as acetone may also be employed advantageously. The reaction is catalyzed by the presence of a small amount of an aqueous non-nucleophilic acid such as perchloric or trichloroacetic acid. Generally, up to about 20% of 0.1 N to 0.3 N acid by weight is preferred. Thus, a suitable solvent mixture will contain 5 ml. of tetrahydrofuran and 1 ml. of 0.3 N aqueous perchloric acid.

Although the reaction will take place at temperatures from about 15° C. to 45° C., it is generally convenient to carry out the reaction at room temperature. The reaction period will vary from about two to ten hours. Generally longer periods of reaction will be required for the lower temperatures and shorter reaction times may be employed at the higher temperatures. At the end of the reaction period the acid is neutralized with a suitable alkaline reagent, for example, aqueous solution of the oxides, hydroxides, carbonates or bicarbonates of the alkali or alkaline earth metals. The desired product is recovered from the neutralized mixture by extraction or by filtration of precipitated product. Suitable extraction solvents include lower alkyl esters or halogenated aromatic solvents containing up to seven carbon atoms. Suitable solvents include ethyl acetate, methyl propionate, chloroform, methylene chloride, ethylene chloride, chlorobenzene, etc.

As indicated above suitable starting materials for the synthesis of the compounds of this invention include $\Delta^{4,6}$-pregnadiene- 14α,15α-epoxido-11β,17α,21-triol-3,20-dione, $\Delta^{4,6}$ - pregnadiene - 14α,15α - epoxido - 17α,21 - diol-3,11,20-trione and their 21 esters. It is apparent, therefore, that by application of the reactions described above, it is possible to prepare valuable compounds of this invention in which the 11 position carries a β-hydroxyl group or is a carbonyl group. It is also possible to prepare compounds of this invention in which the 11 position is a carbonyl group by oxidizing 11β-hydroxyl compounds of this invention. This oxidation reaction is useful for the preparation of 11-keto-15β-halo compounds, but is not applicable to the preparation of corresponding 15β-hydroxyl compounds since with compounds of this type oxidation of a 11β-hydroxyl group leads to concurrent oxidation of a 15β-hydroxyl group.

It is specifically intended to include within the purview of the present invention 11-keto-15β-halo compounds prepared by oxidation of corresponding 11β-hydroxyl compounds. A number of reagents are available for this oxidation. These include, for example, chromium trioxide, sodium dichromate, the chromic acid-pyridine complex, N-chloroacetamide and aluminum isopropoxide or aluminum tert-butoxide in the presence of a hydrogen acceptor such as acetone or cyclohexanol. This latter reaction may be carried out in an inert organic solvent such as benzene, toluene or xylene. The use of an aluminum alkoxide in the presence of a hydrogen acceptor is generally referred to by those skilled in the art as the Oppenauer oxidation.

In carrying out the reactions of this novel process, the opening of the epoxide ring with either halogen acid or a non-nucleophilic acid is preferably carried out, and the oxidation of an 11β-hydroxyl group to an 11-keto group should be carried out with compounds in which the 21-position hydroxyl group is acylated with an acyl hydrocarbon group containing up to twenty carbon atoms.

The term, "acyl hydrocarbon group" includes acyl groups, containing only carbon, hydrogen and oxygen, derived from a monocarboxylic acid or a dicarboxylic acid. In the event that the acyl hydrocarbon group chosen is one derived from a dicarboxylic acid, it is often advantageous to treat the acylated adrenocortically active acid esters with a base derived from an alkali metal or alkaline earth metal. These bases include, for example, sodium, potassium, barium and calcium hydroxides, as well as the corresponding carbonates and bicarbonates. Products so prepared are especially useful because of their increased solubility in water.

Since the 21-position hydroxyl group is the only primary alcohol group present in any of the molecules, whether starting material, intermediate or product, it may be readily esterified by standard methods. Although Fischer esterification and transesterification procedures may be employed, in general it is preferred to form the esters by treatment with an acylating agent such as an acyl halide or acid anhydride in the presence of an organic base such as pyridine or trimethylamine.

The free alcohols are prepared from the corresponding esters by gentle hydrolysis, for example, by treatment with dilute hydrogen chloride in aqueous methanol or potassium carbonate in aqueous methanol.

The therapeutically active compounds of this invention may be administered alone or in combination with acceptable pharmaceutical carriers the choice of which is determined by the preferred route of administration, the solubility of the compound and standard pharmaceutical practices. In general, the dosage of these compounds is of approximately the same order of magnitude as the dosage of hydrocortisone and these compounds are useful to treat the types of pathological conditions often treated with hydrocortisone. Because of their great adrenocortical activity, it is sometimes possible to use dosages of these compounds which are lower than those of hydrocortisone.

For oral administration, the compounds may be administered in the form of tablets containing excipients such as starch or milk sugar. Aqueous suspensions and elixirs, which may be sweetened and flavored, may also be used. To apply these therapeutic agents topically, they may be prepared in ointment or salve form in suitable bases, especially non-aqueous petrolatum type bases. For intra-articular injection, aqueous suspensions may be employed. In this case, various suspending and wetting agents may be added to the composition to obtain a suspension not tending to settle out easily or to pack down in the bottle in which it is stored. Intra-muscular and subcutaneous dosage forms may also be prepared by standard pharmaceutical practices.

The following examples are given solely for the purpose of illustration and are not to be construed as limitations of this invention, many apparent variations of which are possible without departing from the spirit or scope thereof.

EXAMPLE I $\Delta^{4,6}$-pregnadiene - 11β,14α,17α,21 - tetrol-15β-fluoro-3,20-dione 21-acetate To a solution of 7 g. of anhydrous hydrogen fluoride in 14 g. of tetrahydrofuran and 5 ml. of chloroform chilled to about —60° C. was added a solution of 1 g. of $\Delta^{4,6}$-pregnadiene - 11β,17α,21 - triol - 14α,15α-epoxido-3,20-dione 21-acetate in 25 ml. of chloroform also at —60° C. The hydrogen fluoride tetrahydrofuran mixture was maintained at —60° C. while the epoxido compound was being added. An additional 5 ml. of chloroform at —60° C. was used to aid in the transfer of the compound. The reaction mixture was then maintained at about —30° C. for four hours and added to a mixture of aqueous potassium carbonate. The layers were separated and the alkaline aqueous layer extracted twice with 5 ml. portions of chloroform. The combined chloroform solutions were washed with water, dried over anhydrous sodium sulfate, the solvent removed in vacuo and the residue triturated with ether. The product was purified by crystallization and found to be $\Delta^{4,6}$-pregnadiene-11β,14α,17α,21-tetrol-15β-fluoro-3,20-dione 21-acetate.

EXAMPLE II $\Delta^{4,6}$-pregnadiene - 11β,14α,17α,21 - tetrol-15β-chloro-3,20-dione 21-hemisuccinate $\Delta^{4,6}$-pregnadiene - 11β,17α,21 - triol - 14α,15α-epoxido-3,20-dione 21-hemisuccinate (1.5 g.) was dissolved in 35 ml. of alcohol-free chloroform and the solution treated with a 75 molar excess of hydrogen chloride dissolved in 500 ml. of chloroform. Mixing took place at —60° C. The temperature was allowed to increase to —30° C. and maintained at that temperature for four hours. The mixture was then concentrated to dryness in vacuo. The residue was triturated with ether and recrystallized. It proved to be $\Delta^{4,6}$-pregnadiene-11β,14α,17α,21-tetrol-15β-chloro-3,20-dione 21-hemisuccinate.

EXAMPLE III $\Delta^{4,6}$-pregnadiene-11β,14α,15β,17α,21-pentol-3,20-dione $\Delta^{4,6}$-pregnadiene - 11β,17α,21 - triol - 14α,15β-epoxido-3,20-dione (1 g.) was dissolved in 50 ml. of tetrahydrofuran containing 10 ml. of 0.3 N aqueous perchloric acid solution. The mixture was allowed to stand at room temperature for eight hours. It was then poured into an excess of potassium carbonate solution and the aqueous layer extracted with chloroform. The layers were separated and the chloroform solution washed with water. It was dried over anhydrous sodium sulfate and the product recovered by removal of the solvent in vacuo. The product was triturated with ether and recrystallized. It proved to be $\Delta^{4,6}$-pregnadiene-11β,14α,15β,17α,21-pentol-3,20-dione.

EXAMPLE IV $\Delta^{4,6}$-pregnadiene-11β,14α,15β,17α,21-pentol-3,20-dione 21-propionate $\Delta^{4,6}$-pregnadiene - 11β,17α,21 - triol - 14α,15α-epoxido-3,20-dione 21-propionate (100 mg.) was dissolved in 5 ml. of dioxane and 1 ml. of 0.2 N aqueous trichloracetic acid was added. The mixture was allowed to stand for three hours at 35° C. It was neutralized with aqueous sodium bicarbonate solution and the product recovered as described in the previous example.

EXAMPLE V $\Delta^{4,6}$-pregnadiene - 14α,15β,17α,21-tetrol-3,11,20-trione 21 acetate To a solution of 2.5 g. of $\Delta^{4,6}$-pregnadiene-17α,21-diol-14α,15α-epoxido-3,11,20-trione 21-acetate in 5 ml. of acetone, 1 ml. of 0.1 N aqueous perchloric acid was added. The mixture was allowed to stand at 20° for ten hours. It was neutralized with aqueous 2% sodium iodide solution and the product recovered as described in Example III using ethylene chloride as the extraction solvent.

EXAMPLE VI

Δ⁴,⁶-pregnadiene-14α,17α,21-triol-15β-iodo-3,11,20-trione 21-butyrate

To a solution of 5 g. of Δ⁴,⁶-pregnadiene-11β,14α,17α, 21-tetrol-15β-iodo-3,20-dione 21-butyrate in 25 ml. of glacial acetic acid was added 15 ml. of a solution of chromium trioxide in 9:1 acetic acid-water solution containing 76 mg. of chromium trioxide per ml. of solution. The mixture was kept at room temperature during the addition and for an additional four hours. The desired compound was precipitated by addition of water and recrystallized from methanol-chloroform.

EXAMPLE VII

Δ⁴,⁶-pregnadiene-14α,17α,21-triol-15β-iodo-3,11,20-trione 21-acetate

A solution of 0.5 g. of sodium dichromate dihydrate in 10 ml. of glacial acetic acid was added over a thirty minute period to 0.25 g. of Δ⁴,⁶-pregnadiene-11β,14α,17α, 21-tetrol-15β-bromo-3,20-dione 21-acetate in 50 ml. of 1:1 glacial acetic acid-benzene at 10° C. After one hour, an additional 0.3 g. of oxidizing agent in 7 ml. of solvent was added, and the mixture left standing for twenty-four hours at 0° C. The mixture was poured into cold aqueous sodium bisulfite solution and the solution extracted with ether. The ether solution was washed with water until the washings were neutral. The solution was dried over anhydrous sodium sulfate and the ether removed in vacuo to isolate the desired product.

It was found that the same oxidation products prepared in Examples VI and VII could also be synthesized using N-chloroacetamide or the Oppenauer oxidation.

EXAMPLE VIII

The free 21-alcohols of the products prepared as in the previous examples were each prepared by hydrolysis of the ester by addition of one molar portion of potassium carbonate in 10% aqueous-methanol solution of the ester. The mixture was allowed to stand at room temperature for one hour, and then poured into ice water to precipitate the free alcohols.

EXAMPLE IX

A variety of esters of the 21-alcohols of Example VIII were prepared by treating each of the free alcohols with acylating agents by conventional methods. These included such compounds as the formate, the propionate, the isobutyrate, the hexanoate, the benzoate, the octanoate, the stearate, the eicosanoate, the hemisuccinate, the trimethyl acetate, the cyclohexane carbonate, the cyclopentylpropionate, etc. The acid esters of polycarboxylic acids such as the hemisuccinate have the advantage that alkali metal salts can be prepared from them by treating with molar proportions of a base such as sodium bicarbonate or potassium bicarbonate. These salts, in addition to being biologically active, are water soluble, an advantage not possessed by the 21-position steroid alcohols themselves or by ordinary esters thereof.

What is claimed is:

1. A compound selected from the group consisting of:

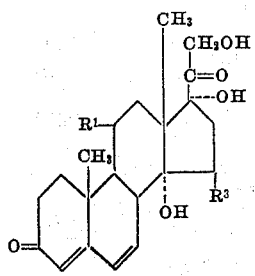

wherein $R^1$ is chosen from the group consisting of keto and β-hydroxyl and $R^3$ is chosen from the group consisting of β-hydroxyl, fluorine, chlorine, bromine and iodine; 21-position esters thereof with a monocarboxylic acid, 21-position acid esters thereof with a dicarboxylic acid, said mono and dicarboxylic acids containing only carbon, hydrogen and oxygen up to a total of twenty carbon atoms; and alkali metal and alkaline earth metal salts of said dicarboxylic acid esters.

2. A pharmaceutical composition comprising a compound as claimed in claim 1 together with a pharmaceutically acceptable carrier.

3. A process for preparing a compound having the formula:

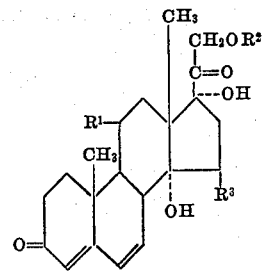

which comprises treating a compound having the formula:

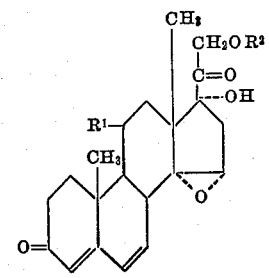

wherein $R^1$ is selected from the group consisting of keto and β-hydroxyl, $R^2$ is hydrocarbon acyl containing up to twenty carbon atoms and $R^3$ is selected from the group consisting of β-hydroxyl, fluorine, chlorine, bromine and iodine with a reagent selected from the group consisting of at least a twenty-five molar excess of a halogen acid in an inert organic solvent selected from the group consisting of tetrahydrofuran, lower aliphatic carboxylic acids containing up to five carbon atoms, hydrocarbon solvents containing up to seven carbon atoms and alcohol-free chloroform at a temperature of from about —60° to 30° C. for a period of from one to four hours; and up to 20% by weight of 0.1 N to 0.3 N aqueous non-nucleophilic acid in a water-miscible organic solvent selected from the group consisting or dioxane, tetrahydrofuran and lower aliphatic ketones at a temperature of from about 15° to 45° C. for a period of from two to ten hours.

4. A process for preparing a compound having the formula:

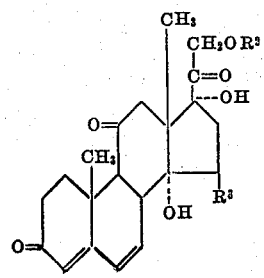

which comprises treating a compound having the formula:

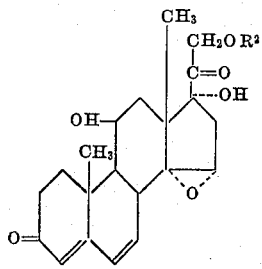

wherein R² is hydrocarbon acyl containing up to twenty carbon atoms and R³ is selected from the group consisting of fluorine, chlorine, bromine and iodine with a reagent selected from the group consisting of at least a 25 molar excess of a halogen acid in an inert organic solvent selected from the group consisting of tetrahydrofuran, lower aliphatic carboxylic acids containing up to five carbon atoms, hydrocarbon solvents containing up to seven carbon atoms and alcohol-free chloroform at a temperature of from about −60° to 30° C. for a period of from one to four hours; and oxidizing resulting compound with an oxidizing agent selected from the group consisting of chromium trioxide, sodium dichromate, the chromic acid-pyridine complex, N-chloroacetamide, aluminum isopropoxide in the presence of a hydrogen acceptor and aluminum tert-butoxide in the presence of a hydrogen acceptor.

No references cited.